US008872975B2

(12) United States Patent
Aoyama

(10) Patent No.: US 8,872,975 B2
(45) Date of Patent: Oct. 28, 2014

(54) RECEIVING DEVICE, DISPLAY CONTROLLING METHOD, AND PROGRAM

(75) Inventor: Shinya Aoyama, Tokyo (JP)

(73) Assignee: Sony Corporation (JP)

( * ) Notice: Subject to any disclaimer, the term of this patent is extended or adjusted under 35 U.S.C. 154(b) by 935 days.

(21) Appl. No.: 12/310,058

(22) PCT Filed: Aug. 8, 2007

(86) PCT No.: PCT/JP2007/065478
§ 371 (c)(1),
(2), (4) Date: Nov. 3, 2009

(87) PCT Pub. No.: WO2008/018479
PCT Pub. Date: Feb. 14, 2008

(65) Prior Publication Data
US 2010/0097522 A1    Apr. 22, 2010

(30) Foreign Application Priority Data

Aug. 8, 2006  (JP) ................. P2006-216023

(51) Int. Cl.
| H04N 7/00 | (2011.01) |
| H04N 11/00 | (2006.01) |
| H04N 5/44 | (2011.01) |
| H04N 9/74 | (2006.01) |
| H04N 5/445 | (2011.01) |
| H04N 21/431 | (2011.01) |
| H04N 21/434 | (2011.01) |
| H04N 21/488 | (2011.01) |
| H04N 5/46 | (2006.01) |
| H04N 21/435 | (2011.01) |
| H04N 21/84 | (2011.01) |
| H04N 21/426 | (2011.01) |

(52) U.S. Cl.
CPC ...... *H04N 5/44508* (2013.01); *H04N 21/42638* (2013.01); *H04N 21/4312* (2013.01); *H04N 21/4348* (2013.01); *H04N 21/4882* (2013.01); *H04N 5/46* (2013.01); *H04N 21/435* (2013.01); *H04N 21/84* (2013.01); *H04N 21/4884* (2013.01)
USPC ........... 348/564; 348/468; 348/553; 348/584; 348/734; 725/38; 725/47

(58) Field of Classification Search
USPC ......... 348/468, 563, 565, 553, 555, 584, 734; 725/38, 47
See application file for complete search history.

(56) References Cited

U.S. PATENT DOCUMENTS 5,223,924 A * 6/1993 Strubbe .......................... 725/46
5,481,296 A * 1/1996 Cragun et al. ................ 725/136
(Continued)

FOREIGN PATENT DOCUMENTS

| JP | 08-317301 A | 11/1996 |
| JP | 11-112874 A | 4/1999 |

(Continued)

*Primary Examiner* — Brian Yenke
(74) *Attorney, Agent, or Firm* — Lerner, David, Littenberg, Krumholz & Mentlik, LLP

(57) ABSTRACT

The present invention relates to a receiving device, a display controlling method, and a program that can make effective use of captions included in programs.
In a TV receiver 1, tuners 11A to 11C are each a tuner for receiving a program. A display section 16 displays caption related information related to caption data included in an object program received by the digital tuner 11B together with an image of a main program received by the digital tuner 11A. The present invention is, for example, applicable to TV receivers having a plurality of tuners for receiving a broadcast program, and the like.

8 Claims, 6 Drawing Sheets

(56) References Cited

U.S. PATENT DOCUMENTS

| | | | |
|---|---|---|---|
| 5,671,019 A * | 9/1997 | Isoe et al. | 348/565 |
| 5,703,655 A * | 12/1997 | Corey et al. | 348/468 |
| 5,867,205 A * | 2/1999 | Harrison | 725/38 |
| 5,995,155 A * | 11/1999 | Schindler et al. | 348/461 |
| 6,005,565 A * | 12/1999 | Legall et al. | 715/721 |
| 6,061,056 A * | 5/2000 | Menard et al. | 715/704 |
| 6,064,952 A * | 5/2000 | Imanaka et al. | 704/9 |
| 6,091,956 A * | 7/2000 | Hollenberg | 455/456.5 |
| 6,240,378 B1 * | 5/2001 | Imanaka et al. | 704/9 |
| 6,243,676 B1 * | 6/2001 | Witteman | 704/243 |
| 6,320,623 B1 * | 11/2001 | Cavallerano et al. | 348/553 |
| 6,502,065 B2 * | 12/2002 | Imanaka et al. | 704/9 |
| 6,556,252 B1 * | 4/2003 | Kim | 348/565 |
| 6,564,244 B1 * | 5/2003 | Ito et al. | 709/204 |
| 6,710,815 B1 * | 3/2004 | Billmaier et al. | 348/515 |
| 6,810,526 B1 * | 10/2004 | Menard et al. | 725/46 |
| 6,833,874 B2 * | 12/2004 | Ozaki et al. | 348/565 |
| 6,925,650 B1 * | 8/2005 | Arsenault et al. | 725/39 |
| 7,111,319 B1 * | 9/2006 | Watkins | 725/139 |
| 7,124,365 B2 * | 10/2006 | Cavallerano et al. | 715/716 |
| 7,254,543 B2 * | 8/2007 | Ibaraki et al. | 704/275 |
| 7,337,462 B2 * | 2/2008 | Dudkiewicz et al. | 725/136 |
| 7,403,755 B2 * | 7/2008 | Zehnle et al. | 455/186.1 |
| 7,417,647 B2 * | 8/2008 | Jeffrey | 345/634 |
| 7,421,725 B2 * | 9/2008 | Hane et al. | 725/46 |
| 7,426,467 B2 | 9/2008 | Nashida et al. | |
| 7,522,219 B2 * | 4/2009 | Carlsgaard et al. | 348/584 |
| 7,765,570 B2 * | 7/2010 | Batrouny et al. | 725/49 |
| 8,181,116 B1 * | 5/2012 | Amacker et al. | 715/760 |
| 8,387,063 B2 * | 2/2013 | Koseki et al. | 718/105 |
| 2002/0010922 A1 * | 1/2002 | Darin et al. | 725/32 |
| 2002/0072895 A1 * | 6/2002 | Imanaka et al. | 704/9 |
| 2003/0061611 A1 * | 3/2003 | Pendakur | 725/46 |
| 2004/0049784 A1 * | 3/2004 | Grzeczkowski | 725/46 |
| 2004/0268419 A1 * | 12/2004 | Danker et al. | 725/136 |
| 2005/0028194 A1 * | 2/2005 | Elenbaas et al. | 725/32 |
| 2005/0273813 A1 | 12/2005 | Nakao | |
| 2006/0031877 A1 * | 2/2006 | Yeo et al. | 725/41 |
| 2007/0094705 A1 * | 4/2007 | Crowley et al. | 725/136 |
| 2007/0288950 A1 * | 12/2007 | Downey et al. | 725/9 |
| 2008/0060008 A1 * | 3/2008 | Wang et al. | 725/39 |
| 2008/0165287 A1 * | 7/2008 | Doswald et al. | 348/718 |
| 2008/0282294 A1 * | 11/2008 | Carpenter et al. | 725/58 |
| 2009/0237422 A1 * | 9/2009 | Modi et al. | 345/685 |
| 2010/0107194 A1 * | 4/2010 | McKissick et al. | 725/40 |

FOREIGN PATENT DOCUMENTS

| | | |
|---|---|---|
| JP | 11-234333 A | 8/1999 |
| JP | 2002-041276 A | 2/2002 |
| JP | 2003-174630 A | 6/2003 |
| JP | 2003-283945 A | 10/2003 |
| JP | 2005-039512 A | 2/2005 |
| JP | 2005-311935 A | 11/2005 |
| JP | 2005-347871 A | 12/2005 |

\* cited by examiner

RECEIVING DEVICE, DISPLAY CONTROLLING METHOD, AND PROGRAM

CROSS-REFERENCE TO RELATED APPLICATIONS

The present application is a national phase entry under 35 U.S.C. §371 of International Application No. PCT/JP2007/065478 filed Aug. 8, 2007, published on Feb. 14, 2008 as WO 2008/018479 A1, and which claims priority from Japanese Patent Application No. JP 2006-216023 filed in the Japanese Patent Office on Aug. 8, 2006, which are incorporated herein by reference.

TECHNICAL FIELD

The present invention relates to a receiving device, a display controlling method, and a program, and particularly to a receiving device, a display controlling method, and a program that, for example, enable effective use of captions included in programs in a TV (Television) receiver having a plurality of tuners for receiving broadcast programs or the like.

BACKGROUND ART

For example, in digital broadcasting, a program can be broadcast including captions in addition to images and sound. A TV receiver receiving programs of the digital broadcasting can, for example, display a caption included in a program such that the caption is superimposed on an image included in the program.

Incidentally, an information collecting device has been proposed which extracts caption information displayed in a specific region in a television image according to a predetermined extraction condition, and which stores the caption information (see Patent Document 1, for example).

In addition, there is a display device that extracts character data from image data output from a TV tuner, and which forcibly switches display data to the image data output from the TV tuner when the character data coincides with a keyword of a desired program (see Patent Document 2, for example).

Patent Document 1: Japanese Patent Laid-Open No. Hei 10-308921
Patent Document 2: Japanese Patent Laid-Open No. Hei 11-112874

DISCLOSURE OF INVENTION

Technical Problem

Incidentally, there is a desire that a method for making effective use of captions included in programs be proposed.

The present invention has been made in view of such a situation, and for example, enables effective use of captions included in programs in a TV receiver having a plurality of tuners for receiving broadcast programs or the like.

Technical Solution

According to one aspect of the present invention, there is provided a receiving device for receiving a program. The receiving device includes: a plurality of receiving means for receiving a program; and display controlling means for making display means for displaying an image display, together with an image of a program received by one of the plurality of receiving means, caption related information related to caption data included in a program received by another receiving means.

The receiving device according to one aspect of the present invention can further include determining means for determining whether the caption data included in the program received by the other receiving means includes a keyword specified in advance, and when the caption data includes the keyword, the display controlling means can make information to an effect that the caption data includes the keyword displayed as the caption related information.

The receiving device according to one aspect of the present invention can further include the display means.

According to one aspect of the present invention, there is provided a display controlling method of a receiving device including a plurality of receiving means for receiving a program, the display controlling method making an image of a program received by the receiving means displayed, or a program for making a computer for controlling the receiving device perform a display controlling process for making an image of a program received by the receiving means displayed. The display controlling method or the program includes: a step of making display means for displaying an image display, together with an image of a program received by one of the plurality of receiving means, caption related information related to caption data included in a program received by another receiving means.

In one aspect of the present invention, the receiving device has a plurality of receiving means for receiving a program. Then, display means for displaying an image displays, together with an image of a program received by one of the plurality of receiving means, caption related information related to caption data included in a program received by another receiving means.

Advantageous Effects

According to one aspect of the present invention, captions included in programs can be used effectively.

EXPLANATION OF REFERENCE NUMERALS

1 TV receiver, 11 tuner section, 12 decoder section, 13 signal switching section, 14 image capture processing section, 15 signal processing section, 16 display section, 17 CPU, 18 RAM, 19 EEPROM, 20 operating section, 21 communicating section, 22 storing section, 23 drive, 24 removable media, 41 display controlling device, 51 caption data display controlling section, 52 notifying message display controlling section, 52A determining section

BEST MODE FOR CARRYING OUT THE INVENTION

Embodiments to which the present invention is applied will hereinafter be described with reference to the drawings.

Figure 1:
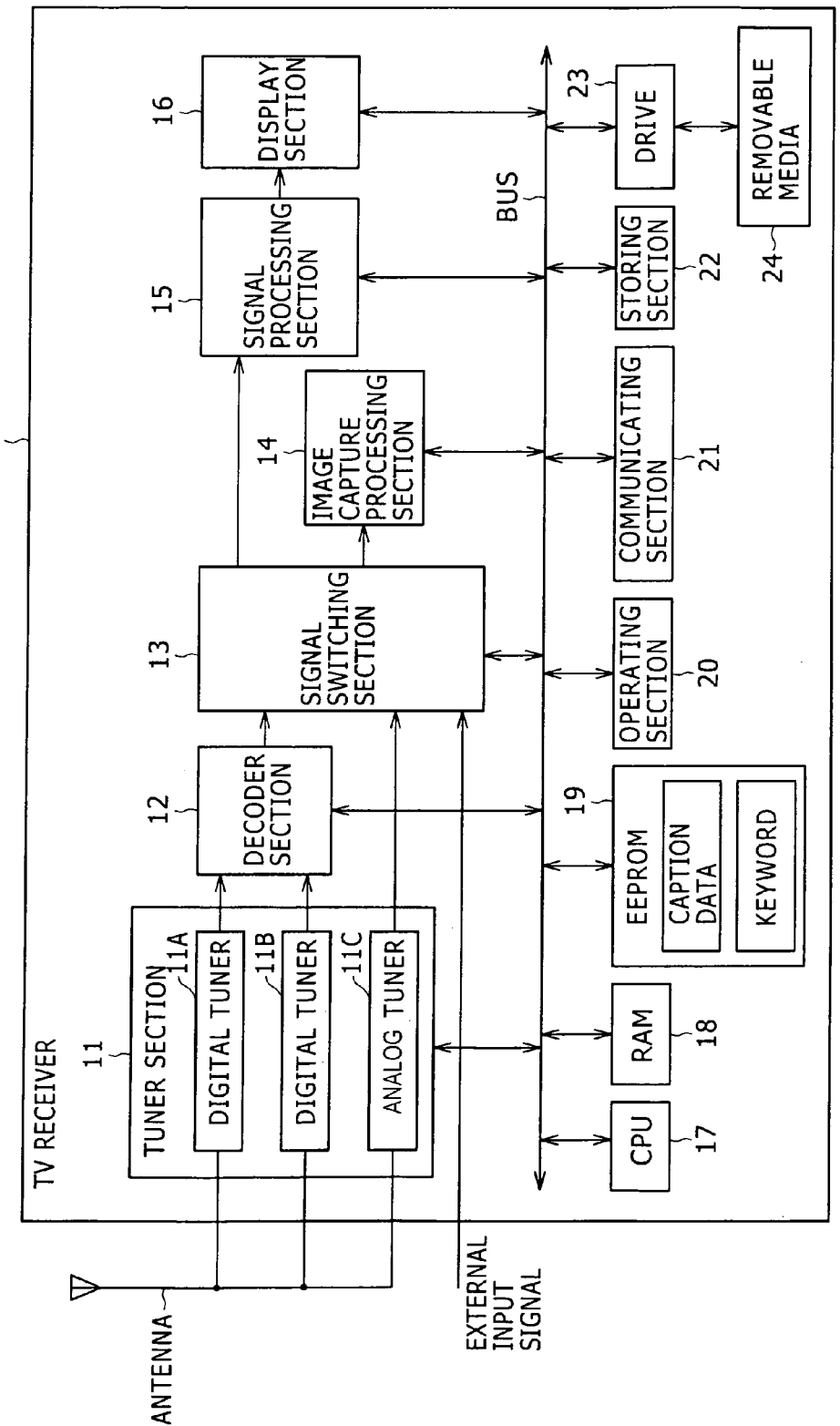
FIG. 1 is a block diagram showing an example of configuration of an embodiment of a TV receiver to which the present invention is applied.

FIG. 1 is a block diagram showing an example of configuration of an embodiment of a TV receiver to which the present invention is applied.

Specifically, in FIG. 1, the TV receiver 1 includes a tuner section 11, a decoder section 12, a signal switching section 13, an image capture processing section 14, a signal processing section 15, a display section 16, a CPU (Central Processing Unit) 17, a RAM (Random Access Memory) 18, an EEPROM (Electrically Erasable and Programmable Read Only Memory) 19, an operating section 20, a communicating section 21, a storing section 22, a drive 23, and removable media 24.

Incidentally, the tuner section 11, the decoder section 12, the signal switching section 13, the image capture processing section 14, the signal processing section 15, the display section 16, the CPU 17, the RAM 18, the EEPROM 19, the operating section 20, the communicating section 21, the storing section 22, and the drive 23 are interconnected via a bus.

The tuner section 11 is composed of a digital tuner 11A, a digital tuner 11B, and an analog tuner 11C as plurality of receiving means for receiving a program.

The digital tuner 11A is a tuner (main tuner) for digital broadcasting. The digital tuner 11A receives a predetermined program of the digital broadcasting. Specifically, according to a control signal supplied from the CPU 17 via the bus, the digital tuner 11A receives a broadcast signal of the digital broadcasting supplied from an antenna, and then extracts a broadcast signal in a predetermined band corresponding to a predetermined program from the broadcast signal. The digital tuner 11A further subjects the broadcast signal in the predetermined band which signal is extracted from the broadcast signal of the digital broadcasting to predetermined processing such as demodulation and the like. Then, the digital tuner 11A separates TS packets of the predetermined program from a transport stream obtained by performing the predetermined processing. The digital tuner 11A supplies the TS packets to the decoder section 12.

The digital tuner 11B is a tuner (sub-tuner) for the digital broadcasting. As with the digital tuner 11A, the digital tuner 113 receives a predetermined program of the digital broadcasting. Specifically, according to a control signal supplied from the CPU 17 via the bus, the digital tuner 11B receives the broadcast signal of the digital broadcasting supplied from the antenna, and then extracts a broadcast signal in a predetermined band corresponding to a predetermined program from the broadcast signal. The digital tuner 11B further subjects the broadcast signal in the predetermined band which signal is extracted from the broadcast signal of the digital broadcasting to predetermined processing such as demodulation and the like. Then, the digital tuner 11B separates TS packets of the predetermined program from a transport stream obtained by performing the predetermined processing. The digital tuner 11B supplies the TS packets to the decoder section 12.

The analog tuner 11C is a tuner for analog broadcasting. The analog tuner 11C receives a predetermined program of the analog broadcasting. Specifically, according to a control signal supplied from the CPU 17 via the bus, the analog tuner 11C receives a broadcast signal of the analog broadcasting supplied from an antenna, and then extracts a broadcast signal in a predetermined band corresponding to a predetermined program from the broadcast signal. The analog tuner 11C further subjects the broadcast signal in the predetermined band which signal is extracted from the broadcast signal of the analog broadcasting to predetermined processing such as demodulation and the like. Then, the analog tuner 11C supplies an image signal and an audio signal of the predetermined program obtained by performing the predetermined processing to the signal switching section 13.

Hereinafter, as appropriate, the program received by the digital tuner 11A will be referred to also as a main program, and the program received by the digital tuner 11B will be referred to also as a sub-program.

According to a control signal supplied from the CPU 17 via the bus, the decoder section 12 performs MPEG (Moving Picture Experts Group) decoding of the TS packets of the main program and the sub-program supplied from the digital tuner 11A and the digital tuner 11B, respectively, and then supplies resulting data (signal) of the main program and the sub-program to the signal switching section 13.

In this case, the data of the programs obtained by the MPEG decoding of the TS packets includes an image signal and an audio signal, and further includes caption data as required.

The signal switching section 13 is supplied with the data of the main program and the sub-program received by the digital tuner 11A and the digital tuner 11B from the decoder section 12, supplied with the image signal and the audio signal of the program of the analog broadcasting from the analog tuner 11C, and supplied with an external input signal including an image signal and an audio signal from an external device not shown in the figure.

According to a control signal supplied from the CPU 17 via the bus, the signal switching section 13 selects the image signal included in the data of the main program or the sub-program which data is supplied from the decoder section 12, the image signal of the program supplied from the analog tuner 11C, or the image signal included in the external input signal supplied from the external device. The signal switching section 13 then supplies the image signal to the image capture processing section 14 and the signal processing section 15.

In addition, according to a control signal supplied from the CPU 17 via the bus, the signal switching section 13 supplies the caption data included in the data of the main program and the sub-program supplied from the decoder section 12 to the EEPROM 19 via the bus to make the caption data stored in the EEPROM 19.

Further, the signal switching section 13 supplies a speaker not shown in the figure with the audio signal accompanying the image signal supplied to the signal processing section 15 among the image signal included in the data of the main program or the sub-program, the image signal of the program supplied from the analog tuner 11C, and the image signal included in the external input signal supplied from the external device.

According to a control signal supplied from the CPU 17 via the bus, the image capture processing section 14 performs a process of capturing an image corresponding to the image signal supplied from the signal switching section 13 in predetermined timing, and then supplies a resulting capture image signal to the storing section 22, for example, via the bus.

The signal processing section 15 combines the image signal supplied from the signal switching section 13 with caption data, a notifying message or the like to be described later as required, converts a resulting image signal into an image signal in such a format as to be displayable on the display section 16, and then supplies the image signal to the display section 16.

The display section 16 displays an image corresponding to the image signal supplied from the signal processing section 15.

The CPU 17 performs control of each block forming the TV receiver 1 and the like by executing a program stored in the EEPROM 19 or the storing section 22.

The RAM 18 stores the program executed by the CPU 17, data, and the like as required.

The EEPROM 19, for example, stores the program executed by the CPU 17. In addition, the EEPROM 19, for example, stores caption data supplied from the signal switching section 13 via the bus as well as a keyword and the like input by a user operating the operating section 20.

The operating section 20 is operated by the user when a channel or a sound volume is changed, and the like. The operating section 20 supplies an operating signal corresponding to the operation to the CPU 17 via the bus.

The communicating section 21 communicates with an external device via a network such as the Internet, a local area network or the like. For example, a program to be executed by the CPU 17 can be downloaded via the communicating section 21, and installed in the EEPROM 19 or the storing section 22.

The storing section 22 is, for example, formed by a hard disk or the like. The storing section 22 stores the program to be executed by the CPU 17, data, and the like. In addition, the storing section 22, for example, stores the capture image signal supplied from the image capture processing section 14.

The removable media 24 such as a magnetic disk, an optical disk, a magneto-optical disk, a semiconductor memory and the like can be attached to and removed from the drive 23. When the removable media 24 are loaded into the drive 23, the drive 23 drives the removable media 24 to read a program, data and the like recorded on the removable media 24 or perform writing to the removable media 24. Incidentally, the program and the data read from the removable media 24 by the drive 23 are transferred to the EEPROM 19 or the storing section 22 via the bus to be stored in the EEPROM 19 or the storing section 22 as required.

The CPU 17 in FIG. 1, for example, executes a program stored in the EEPROM 19 or the storing section 22, and thereby functions as a display controlling device for displaying caption related information related to caption data included in another program (sub-program) received by the digital tuner 11B together with an image of a program (main program) received by the digital tuner 11A.

Figure 2:
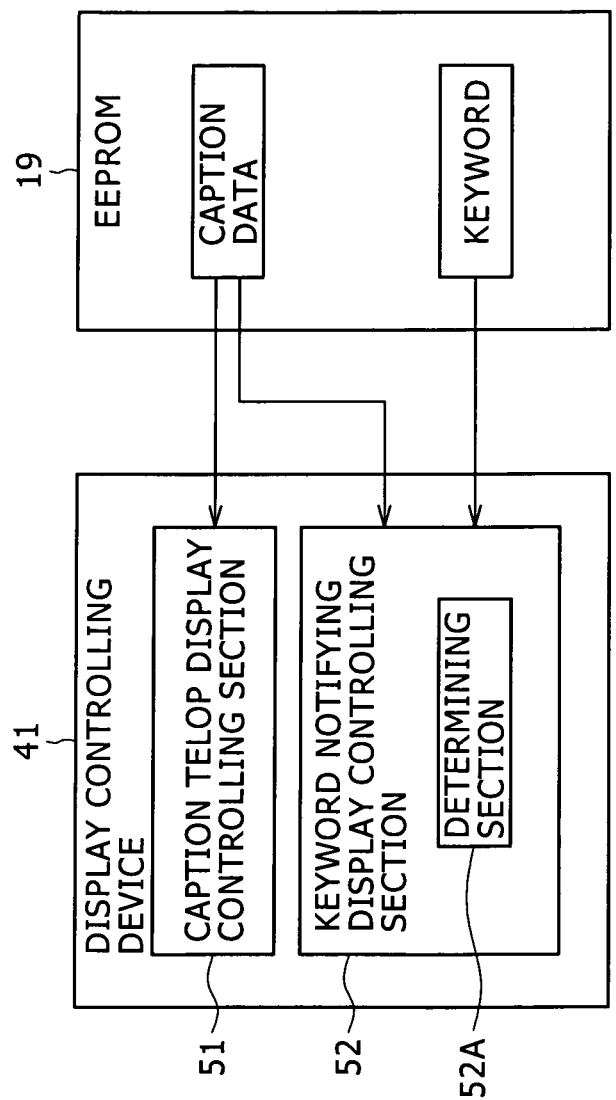
FIG. 2 is a block diagram showing an example of functional configuration of a display controlling device 41 and an EEPROM 19.

FIG. 2 is a block diagram showing an example of functional configuration of such a display controlling device 41 and the EEPROM 19 referred to by the display controlling device 41.

Specifically, in FIG. 2, the display controlling device 41 includes a caption data display controlling section 51 and a notifying message display controlling section 52.

The caption data display controlling section 51 in the display controlling device 41 reads caption data stored in the EEPROM 19 and then supplies the caption data to the signal processing section 15 via the bus, and controls the signal processing section 15 so that the caption data is combined with (superimposed on) the image signal of the program supplied from the signal switching section 13 to the signal processing section 15. Thereby, the caption data is displayed as a telop on the display section 16 together with the image of the program supplied from the signal switching section 13 to the signal processing section 15.

The notifying message display controlling section 52 has a determining section 52A. The determining section 52A reads caption data stored in the EEPROM 19, and determines whether the caption data includes a keyword specified in advance and stored in the EEPROM 19. When the determining section 52A determines that the caption data read from the EEPROM 19 includes the keyword specified in advance, the determining section 52A supplies a notifying message, which is a message indicating that the caption data includes the keyword, to the signal processing section 15 via the bus, and controls the signal processing section 15 so that the notifying message is combined with (superimposed on) the image signal of the program supplied from the signal switching section 13 to the signal processing section 15. Thereby, the notifying message is displayed as a pop-up on the display section 16 together with the image of the program supplied from the signal switching section 13 to the signal processing section 15.

The operation of the TV receiver 1 will next be described.

For example, when a user operates the operating section 20 to turn on the power to the TV receiver 1 and then specify a channel of the digital broadcasting, an operating signal corresponding to the operation is supplied from the operating section 20 to the CPU 17 via the bus. According to the operating signal from the operating section 20, the CPU 17 supplies a control signal to the tuner section 11 and the signal switching section 13 via the bus.

In the tuner section 11, the digital tuner 11A obtains TS packets of the channel specified by the operation of the operating section 20 by the user from the broadcast signal from the antenna according to the control signal from the CPU 17. The digital tuner 11A then supplies the TS packets to the decoder section 12.

The decoder section 12 decodes the TS packets from the digital tuner 11A, and then supplies the data of a main program obtained as a result thereof to the signal switching section 13.

The signal switching section 13 selects the data of the main program supplied from the digital tuner 11A via the decoder section 12 according to the control signal from the CPU 17, and then supplies an image signal included in the data of the main program to the signal processing section 15. The signal processing section 15 makes the display section 16 display an image corresponding to the image signal from the signal switching section 13.

Thus, the display section 16 displays the image of the main program, which is a program being broadcast on the channel specified by the operation of the operating section 20 by the user.

After the image of the main program is displayed on the display section 16, or in parallel with the process of making the display section 16 display the image of the main program, the TV receiver 1 performs a caption related information display controlling process that makes the display section 16 display caption related information related to caption data of another program together with the image of the main program.

Figure 3:
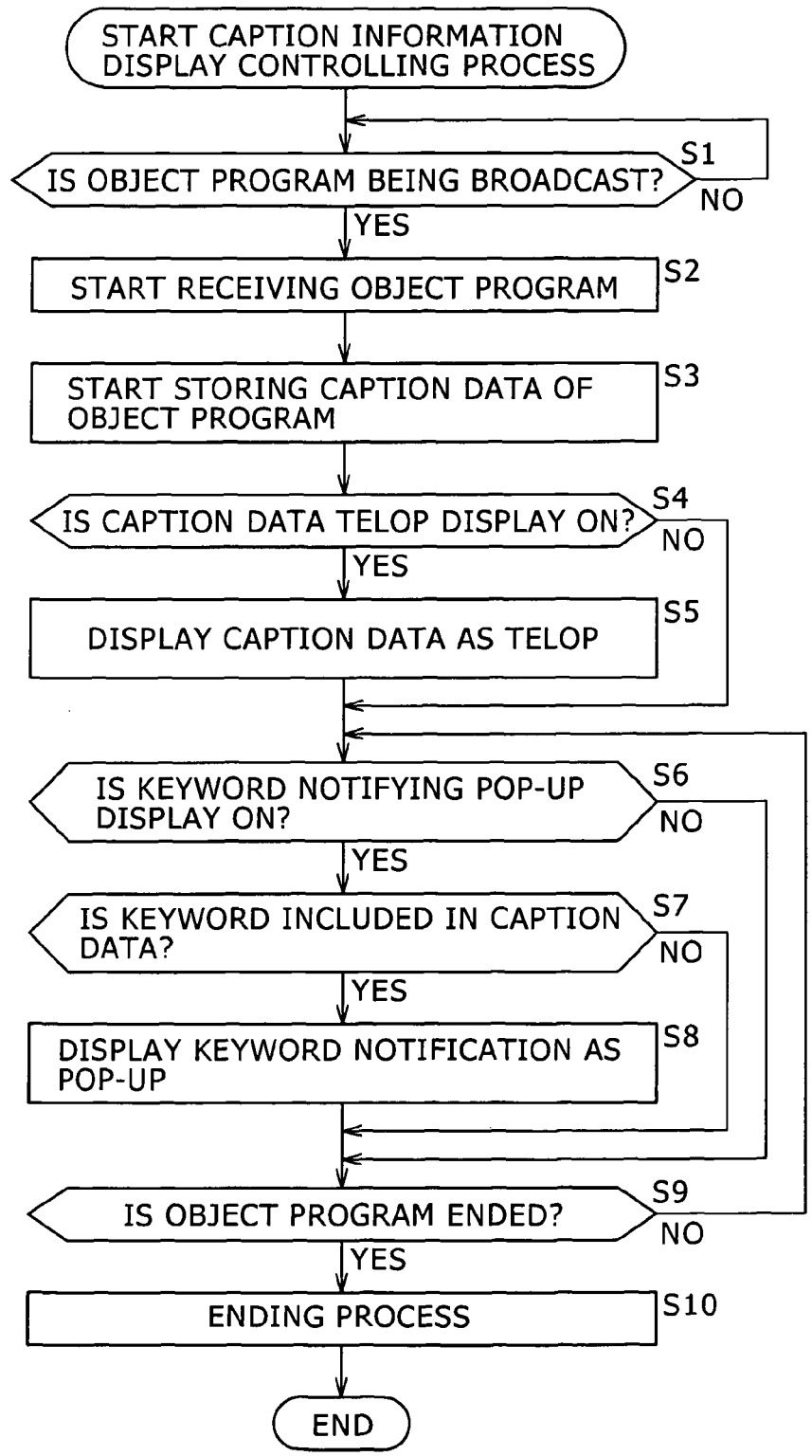
FIG. 3 is a flowchart of a caption related information display controlling process of the TV receiver 1.

The caption related information display controlling process of the TV receiver 1 will be described with reference to a flowchart of FIG. 3.

In step S1, the display controlling device 41 (FIG. 2) determines whether a program as an object whose caption related information (which program will hereinafter be referred to as an object program) is being broadcast.

Figure 4:
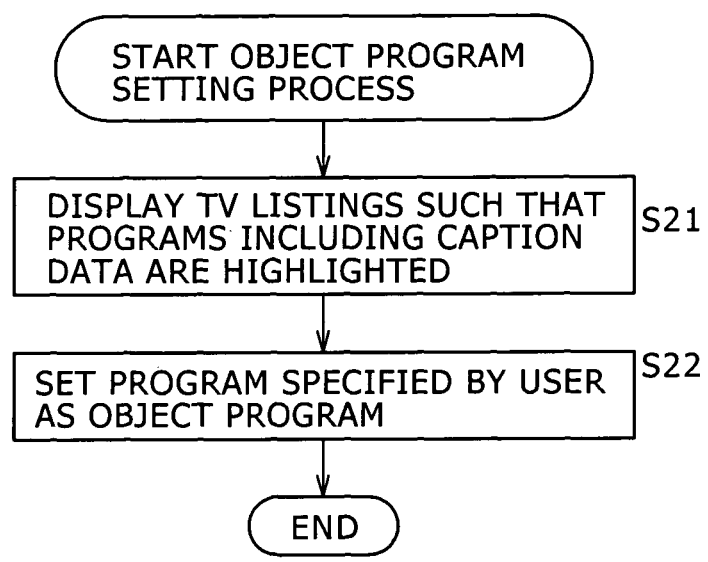
FIG. 4 is a flowchart of an object program setting process of the TV receiver 1.

In this case, suppose that the object program is already set by performing a process of FIG. 4 to be described later in advance. In addition, the display controlling device 41 recognizes a broadcasting date and time of the object program from program related information such as an EPG (Electronic Program Guide) or the like, for example, and determines whether the object program is being broadcast on the basis of the broadcasting date and time.

When it is determined in step S1 that the object program is not being broadcast, the process returns to step S1.

In addition, when it is determined in step S1 that the object program is being broadcast, the process proceeds to step S2, where the display controlling device 41 starts receiving the object program by controlling the digital tuner 11B in the tuner section 11 via the bus. The process then proceeds to step S3.

Here, according to the control of the display controlling device 41, the digital tuner 11B obtains TS packets of the object program from a broadcast signal from the antenna. The digital tuner 11B then supplies the TS packets to the decoder section 12.

The decoder section 12 decodes the TS packets from the digital tuner 11B, and then supplies the data of the object program obtained as a result thereof to the signal switching section 13.

The signal switching section 13 separates caption data from the data of the object program which data is supplied from the digital tuner 11B via the decoder section 12, and then supplies the caption data to the EEPROM 19 via the bus.

In step S3, the display controlling device 41 controls the EEPROM 19 via the bus to thereby start storing the caption data of the object program which caption data is supplied from the signal switching section 13 to the EEPROM 19 via the bus. That is, the EEPROM 19 thereby stores the caption data of the object program.

Thereafter, in step S4, the display controlling device 41 in FIG. 2 determines whether caption telop display, that is, displaying of caption data as a telop is set on (ON).

In this case, the caption telop display refers to displaying of caption data as a telop. The TV receiver 1 allows the user to set the caption telop display on or off by operating the operating section 20, for example.

When it is determined in step S4 that the caption telop display is set on, the process proceeds to step S5, where the caption data display controlling section 51 starts making the display section 16 display the caption data of the object program together with the image of the main program.

Specifically, the caption data display controlling section 51 reads the caption data of the object program which caption data is stored in the EEPROM 19 and supplies the caption data of the object program to the signal processing section 15 via the bus, and controls the signal processing section 15 so as to combine (superimpose) the caption data of the object program and the image signal of the main program supplied from the signal switching section 13 to the signal processing section 15.

According to the control of the caption data display controlling section 51, the signal processing section 15 combines the image signal of the main program and the caption data of the object program with each other so that the caption data stored in the EEPROM 19 is displayed as a telop in a region at an edge of a screen of the image of the main program from the signal switching section 13. The signal processing section 15 then supplies the result to the display section 16.

Thereby, the display section 16 displays the caption data of the object program as a telop together with the image of the main program supplied from the signal switching section 13 to the signal processing section 15.

When it is determined in step S4 that the caption telop display is set off (OFF), on the other hand, step S5 is skipped, and the process proceeds to step S6, where the display controlling device 41 in FIG. 2 determines whether keyword notifying pop-up display, that is, displaying of a notifying message as a pop-up is set on.

In this case, the keyword notifying pop-up display refers to, for example, displaying of a pop-up to the effect that a keyword set in advance by the user is included in the caption data. The TV receiver 1 allows the user to set the keyword notifying pop-up display on or off by operating the operating section 20, for example.

Incidentally, suppose in this case that the keyword is already stored in the EEPROM 19 by the operation of the operating section 20 by the user.

When it is determined in step S6 that the keyword notifying pop-up display is set on, the notifying message display controlling section 52 in FIG. 2 reads the caption data of the object program which caption data is already stored in the EEPROM 19 and the keyword stored in advance in the EEPROM 19. The process then proceeds to step S7, where the notifying message display controlling section 52 determines whether the caption data of the object program includes the keyword.

When it is determined in step S7 that the caption data of the object program includes the keyword, the process proceeds to step S8, where the notifying message display controlling section 52 generates a notifying message to the effect that the caption data includes the keyword and then supplies the notifying message to the signal processing section 15 via the bus, and controls the signal processing section 15 so as to combine (superimpose) the notifying message and the image signal of the main program supplied from the signal switching section 13 to the signal processing section 15.

According to the control of the notifying message display controlling section 52, the signal processing section 15 combines the image signal of the main program and the notifying message with each other so that the notifying message is displayed as a pop-up in a region at an edge of a screen of the image of the main program from the signal switching section 13. The signal processing section 15 then supplies the result to the display section 16.

Thereby, the display section 16 displays the notifying message as a pop-up together with the image of the main program supplied from the signal switching section 13 to the signal processing section 15.

On the other hand, when it is determined in step S6 that the keyword notifying pop-up display is set off, and when it is determined in step S7 that the caption data of the object program does not includes the keyword, the process proceeds to step S9, where the display controlling device 41 determines whether the broadcasting of the object program is ended.

When it is determined in step S9 that the broadcasting of the object program is not ended, the process returns to step S6 to repeat a similar process from step S6 on down.

In addition, when it is determined in step S9 that the broadcasting of the object program is ended, the process proceeds to step S10, where the display controlling device 41 performs an ending process such as ending the reception of the program by controlling the digital tuner 11B and further ending the storage of the caption data by the EEPROM 19. Then the caption related information display controlling process is ended.

A process of setting an object program by the TV receiver 1 will next be described with reference to a flowchart of FIG. 4.

For example, when a user operates the operating section 20 to set an object program, the CPU 17, for example, reads an EPG from the storing section 22.

Specifically, the storing section 22, for example, stores an EPG extracted from a broadcast signal received by the tuner section 11 or an EPG downloaded from a site (server) on the Internet by the communicating section 21. The CPU 17 reads the EPG from the storing section 22.

The EPG includes caption presence/absence information indicating whether caption data is included in the data of a program as well as the title of the program and the like. The CPU 17 recognizes programs including caption data by referring to the caption presence/absence information.

Then, the CPU 17 in step S21 controls the display section 16 via the signal processing section 15 to display the EPG such that the program sections of programs including caption data are emphasized.

The display section 16 thereby displays the EPG such that the program sections of the programs including the caption data are emphasized.

As described above, the EPG is displayed such that the program sections of the programs including the caption data are emphasized, whereby the user can easily recognize the programs including the caption data.

When the user thereafter specifies the program section of a desired program among the program sections highlighted on the EPG by operating the operating section 20, in step S22, an operating signal corresponding to the operation is supplied from the operating section 20 to the CPU 17 via the bus. The CPU 17 sets the program of the program section specified by the user as an object program according to the operating signal from the operating section 20.

Specifically, the CPU 17 supplies program related information or the like such as the broadcasting date and time of the program specified by the user or the like to the EEPROM 19 via the bus to store the program related information or the like in the EEPROM 19. Then the object program setting process is ended.

Examples of display of the display section 16 in FIG. 1 will next be described with reference to FIG. 5 and FIG. 6.

Figure 5:
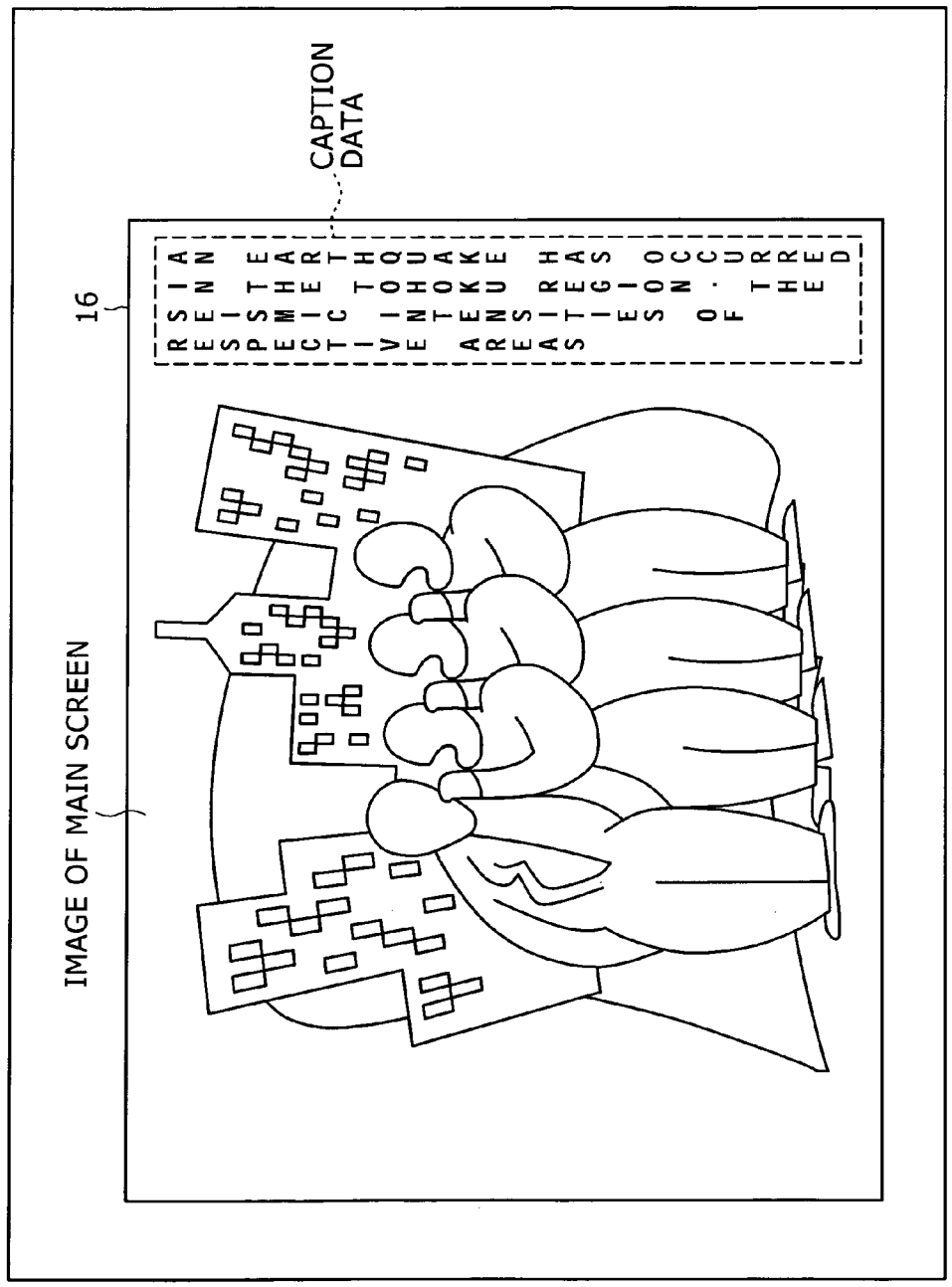
FIG. 5 is a diagram showing an example of display of the display section 16.

FIG. 5 shows an example of display of the display section 16 displaying caption data together with an image of a main program.

In FIG. 5, the image of the main program is displayed on the display section 16.

Further, the caption data of an object program which caption data reads "AN EARTHQUAKE HAS OCCURRED IN THE TOHOKU REGION. THE SEISMIC INTENSITIES OF RESPECTIVE AREAS" is displayed at a right edge of the image of the main program on the display section 16 in such a manner as to be superimposed on the image of the main program.

As described above, the TV receiver 1 receives the object program by the digital tuner 11B other than the digital tuner 11A receiving the main program, and displays the caption data included in the object program together with the image of the main program, whereby the caption data can be used effectively.

That is, the user can view both the image of the main program and the caption data of the object program. Thus, when the broadcasting times of the main program and the object program overlap each other, for example, the user can grasp the contents of both the main program and another program as the object program whose caption data is displayed.

Figure 6:
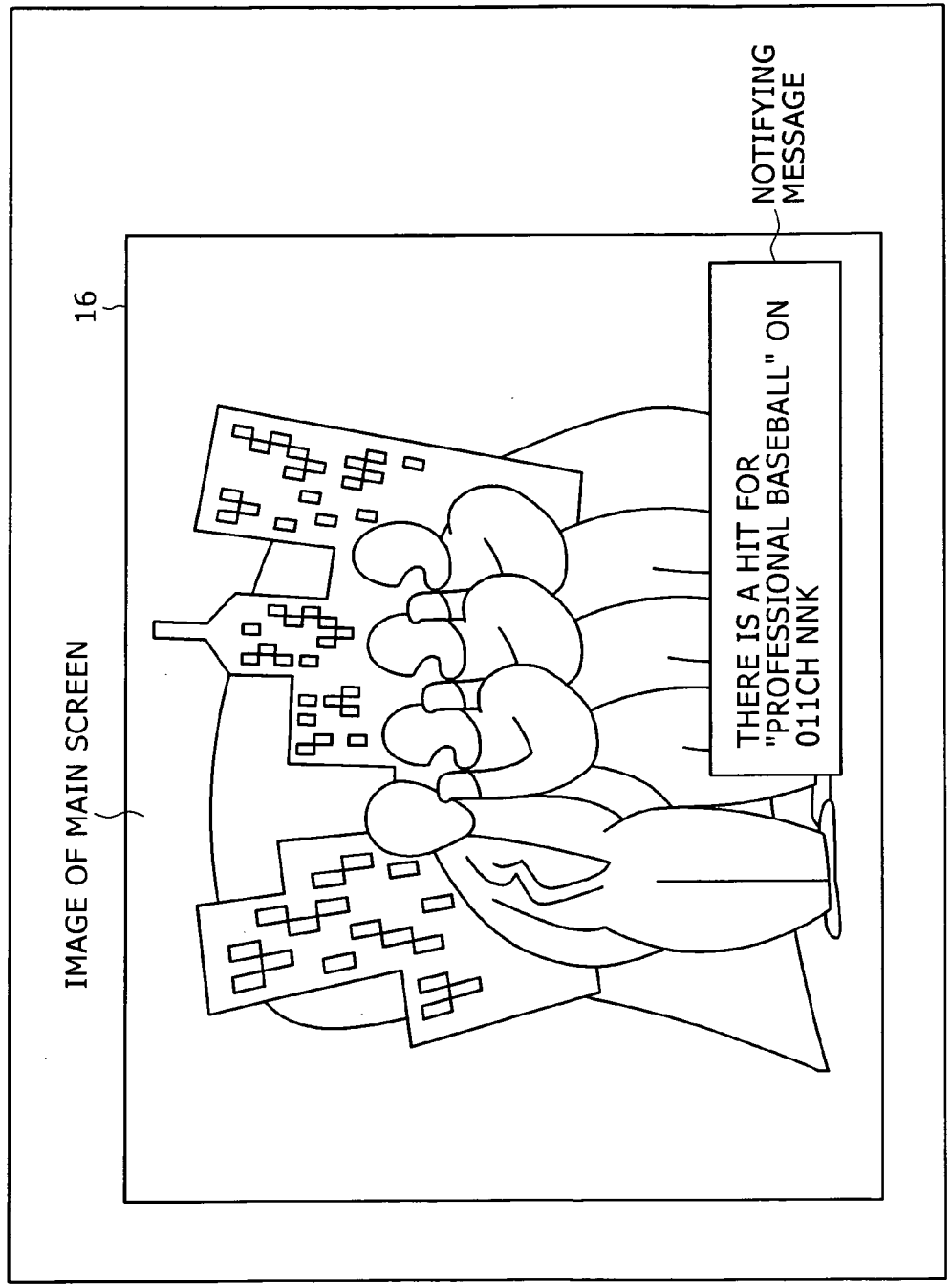
FIG. 6 is a diagram showing an example of display of the display section 16.

FIG. 6 shows an example of display of the display section 16 displaying a notifying message together with an image of a main program.

In FIG. 6, the image of the main program is displayed on the display section 16.

Further, the notifying message to the effect that the caption data of an object program includes a keyword, which notifying message reads "THERE IS A HIT FOR 'PROFESSIONAL BASEBALL' ON 011CH NNK," is displayed as a pop-up at a lower right edge of the image of the main program on the display section 16.

As described above, the TV receiver 1 receives the object program by the digital tuner 11B other than the digital tuner 11A receiving the main program, determines whether the caption data of the object program includes a keyword, and when the caption data includes a keyword, displays a notifying message to the effect that the caption data includes the keyword together with the image of the main program, whereby the caption data can be used effectively.

Specifically, for example, when the user desires to know only information on professional baseball as part of information broadcast on a news program, the news program is set as an object program, and "professional baseball" or the like is specified as a keyword. When the keyword "professional baseball" appears in the caption data included in the news program on the news program as an object program, the TV receiver 1 displays a notifying message as shown in FIG. 6 as a pop-up.

According to such a notifying message, the user can easily recognize while viewing a main program that the broadcasting of information on professional baseball has started on the news program as an object program, and change the channel to view the news program if necessary.

Thus, according to the notifying message, the user can be prompted to view the object program.

Incidentally, when the caption data of the object program is, for example, speech contents of a plurality of speakers, and different colors are designated for different speakers as display colors of the caption data as speech contents, the TV receiver 1 can display the caption data as speech contents in the colors designated for the different speakers. In this case, the speakers speaking the speech contents can be distinguished from each other.

In addition, the TV receiver 1 can display the caption data stored in the EEPROM 19 in arbitrary timing in response to an operation of the user. In this case, by viewing the caption data of the object program, the user can grasp the contents of the object program even after an end of the object program or in the middle of the object program.

In this case, the TV receiver 1 can record all of the data of a program received by the digital tuner 11A, the digital tuner 11B, or the analog tuner 11C in the storing section 22. However, when all of the data of a program is to be recorded, a high-capacity storage device is necessary as the storing section 22 to store the images and sound of the program to be recorded, and even when an HDD (Hard Disk Drive) having a relatively high storage capacity is employed as the storing section 22, the storage capacity will soon become insufficient. Accordingly, in a use where it suffices to grasp the contents of programs, only caption data whose amount of information is smaller than that of images and sound is stored, so that a large number of programs can be stored. The recording (storage) of only such caption data can be performed even when the tuner section 11 is formed by one tuner.

In addition, the TV receiver 1 can store capture images or the like captured at arbitrary positions of the object program together with the caption data of the object program, and later display the capture images together with the caption data. In this case, the user can check the contents of the object program as if viewing a so-called picture-card show.

Incidentally, the TV receiver 1 can display caption related information such as caption data, a notifying message and the like together with the image of a program included in an external input signal or the image of a program broadcast in analog broadcasting received by the analog tuner 11C in place of the image of a main program.

As caption data, in addition to caption data included in programs of the digital broadcasting, character strings (character data) obtained by character recognition performed on images of programs can be employed.

In the above-described object program setting process, object programs can be set also in channel units rather than in program units. That is, all programs including caption data which programs are broadcast on a certain channel can be set as an object program.

While the above description has been made of a case where the present invention is applied to a TV receiver having a plurality of tuners receiving a program, the present invention is also applicable to, for example, receiving devices without the display section 16, receiving devices receiving programs of Internet broadcasting, and the like.

It is to be noted that in the present specification, the steps describing a program stored on a program recording medium include not only processes carried out in time series in the described order but also processes carried out in parallel or individually and not necessarily in time series.

In addition, embodiments of the present invention are not limited to the foregoing embodiment, and various changes can be made without departing from the spirit of the present invention.

The invention claimed is:

1. A receiving device for receiving a program, said receiving device comprising:
    a plurality of receiving means for receiving a program; and
    display controlling means for making display means for displaying an image display, together with an image of a first program being broadcast received by one of said plurality of receiving means, (i) caption related information related to caption data included in a second program being broadcast received by another receiving means, wherein the second program being broadcast is received by the another receiving means based on a determination whether the second program is an object program set in advance, and (ii) when a result of a determination, when the second program being broadcast is received by the another receiving means based on a determination that the second program is the object program, is the caption data included in the second program includes a keyword set in advance, a notifying message to an effect that the caption data includes the keyword as a pop-up, the pop-up including the keyword as information displayed therein and the keyword being displayed with indicia in the pop-up to distinguish the keyword from other information displayed in the pop-up, the other information indicating a channel on which the second program is being broadcast and the other information only indicating information on the second program determined to be the object program set in advance,
    wherein said display controlling means makes said display means display, from a memory in which an image captured at a position of the second program is stored together with the caption data, the image captured at the position of the second program together with the caption data stored therewith as the caption related information,
    wherein the caption data is displayed as said caption related information in a region at a first edge of a screen on which the image of the first program is displayed and the notifying message as the pop-up is displayed in a region at a second edge of the screen on which the image of the first program is displayed, the first edge being different from the second edge,
    in which character data obtained by character recognition performed on an image of the second program can be utilized as the caption data.

2. The receiving device according to claim 1,
    wherein said display controlling means makes said display means display the caption data included in the second program received by said other receiving means as said caption related information.

3. The receiving device according to claim 1, further comprising
    determining means for determining whether the caption data included in the second program received by said other receiving means includes the keyword,
    wherein when said caption data includes said keyword, said display controlling means makes information to an effect that said caption data includes said keyword displayed as said caption related information.

4. The receiving device according to claim 1, further comprising said display means.

5. The receiving device according to claim 1, wherein, when the determination is the second program is the object program, the another receiving means receives the second program.

6. The receiving device according to claim 1, wherein the determination is on a basis of broadcasting date and time of the object program.

7. A display controlling method of a receiving device including a plurality of receiving means for receiving a program, said display controlling method making an image of a program received by said receiving means displayed, said display controlling method comprising:
    a step of making display means for displaying an image display, together with an image of a first program being broadcast received by one of said plurality of receiving means, (i) caption related information related to caption data included in a second program being broadcast received by another receiving means, wherein the second program being broadcast is received by the another receiving means based on a determination whether the second program is an object program set in advance and (ii) when a result of a determination, when the second program being broadcast is received by the another receiving means based on a determination that the second program is the object program, is the caption data included in the second program includes a keyword set in advance, a notifying message to an effect that the caption data includes the keyword as a pop-up, the pop-up including the keyword as information displayed therein and the keyword being displayed with indicia in the pop-up to distinguish the keyword from other information displayed in the pop-up, the other information indicating a channel on which the second program is being broadcast and the other information only indicating information on the second program determined to be the object program set in advance; and
    a step of making the display means for displaying an image display, from a memory in which an image captured at a position of the second program is stored together with the caption data, the image captured at the position of the second program together with the caption data stored therewith as the caption related information,
    wherein the caption data is displayed as said caption related information in a region at a first edge of a screen on which the image of the first program is displayed and the notifying message as the pop-up is displayed in a region at a second edge of the screen on which the image of the first program is displayed, the first edge being different from the second edge, in which character data obtained by character recognition performed on an image of the second program can be utilized as the caption data.

8. A non-transitory computer readable medium on which is recorded a program including instructions for making a computer for controlling a receiving device including a plurality of receiving means for receiving a program perform a display controlling process for making an image of a program received by said receiving means displayed, said computer performing:

a step of making display means for displaying an image display, together with an image of a first program being broadcast received by one of said plurality of receiving means, (i) caption related information related to caption data included in a second program being broadcast received by another receiving means, wherein the second program being broadcast is received by the another receiving means based on a determination whether the second program is an object program set in advance, and (ii) when a result of a determination, when the second program being broadcast is received by the another receiving means based on a determination that the second program is the object program, is the caption data included in the second program includes a keyword set in advance, a notifying message to an effect that the caption data includes the keyword as a pop-up, the pop-up including the keyword as information displayed therein and the keyword being displayed with indicia in the pop-up to distinguish the keyword from other information displayed in the pop-up, the other information indicating a channel on which the second program is being broadcast and the other information only indicating information on the second program determined to be the object program set in advance; and a step of making the display means for displaying an image display, from a memory in which an image captured at a position of the second program is stored together with the caption data, the image captured at the position of the second program together with the caption data stored therewith as the caption related information, wherein the caption data is displayed as said caption related information in a region at a first edge of a screen on which the image of the first program is displayed and the notifying message as the pop-up is displayed in a region at a second edge of the screen on which the image of the first program is displayed, the first edge being different from the second edge, in which character data obtained by character recognition performed on an image of the second program can be utilized as the caption data.

\* \* \* \* \*